United States Patent
Kawano et al.

(10) Patent No.: US 9,831,769 B2
(45) Date of Patent: Nov. 28, 2017

(54) SWITCHING REGULATOR

(71) Applicant: SII Semiconductor Corporation, Chiba-shi, Chiba (JP)

(72) Inventors: Akihiro Kawano, Chiba (JP); Katsuya Goto, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 0 days.

(21) Appl. No.: 15/459,514

(22) Filed: Mar. 15, 2017

(65) Prior Publication Data
US 2017/0271985 A1 Sep. 21, 2017

(30) Foreign Application Priority Data

Mar. 16, 2016 (JP) .................. 2016-052840

(51) Int. Cl.
*H02M 3/156* (2006.01)
*H02M 3/158* (2006.01)

(52) U.S. Cl.
CPC .................. *H02M 3/156* (2013.01)

(58) Field of Classification Search
CPC .......... H02M 2001/0022; H02M 1/32; H02M 3/156; H02M 3/158; H02M 3/1588; G05F 1/618

See application file for complete search history.

(56) References Cited

U.S. PATENT DOCUMENTS

| | | | |
|---|---|---|---|
| 8,299,773 B2 * | 10/2012 | Jang | H02M 1/36 323/222 |
| 9,496,852 B2 * | 11/2016 | Nene | H02M 3/158 |
| 2005/0253568 A1 | 11/2005 | Morimoto | |
| 2009/0039859 A1 * | 2/2009 | Shoji | H02M 1/36 323/299 |
| 2012/0049832 A1 * | 3/2012 | Shinyama | G03G 15/5004 323/299 |

* cited by examiner

Primary Examiner — Gary L Laxton
(74) Attorney, Agent, or Firm — Brinks Gilson & Lione

(57) ABSTRACT

To provide a switching regulator equipped with a power supply monitoring circuit small in current consumption. A switching regulator is configured to intermittently operate a power supply monitoring circuit only for a prescribed period based on a signal turning on a switching element, which is outputted from an output control circuit.

4 Claims, 7 Drawing Sheets

SWITCHING REGULATOR

RELATED APPLICATIONS

This application claims priority under 35 U.S.C. §119 to Japanese Patent Application No. 2016-052840 filed on Mar. 16, 2016, the entire content of which is hereby incorporated by reference.

BACKGROUND OF THE INVENTION

Field of the Invention

The present invention relates to a switching regulator, and particularly to a switching regulator equipped with a power supply monitoring circuit which monitors a power supply voltage Vin to prevent a malfunction.

Background Art

A switching regulator may have the generation of a large current and a high voltage in its output by a malfunction of an internal circuit thereof when a power supply voltage Vin is significantly reduced. In order to prevent it, the switching regulator is equipped with a power supply monitoring circuit.

FIG. 7 is a circuit diagram illustrating a related art switching regulator. A PMOS transistor 3 being a switching element performs switching according to a control signal inputted thereto. An inductor 5 and an output capacitor 6 smooth a voltage subjected to the switching. A diode 4 makes a current to flow when the PMOS transistor 3 is off. An output control circuit 15 performs switching control on the PMOS transistor 3 in such a manner that an output voltage thereof becomes a prescribed constant voltage. An RS-FF circuit 13 outputs a signal to the output control circuit 15, based on a signal of an error comparator 10 and a signal of an on-time control circuit 11. The error comparator 10 outputs the signal to the RS-FF circuit 13, based on a reference voltage of a reference voltage circuit 12 and a feedback voltage of a voltage division resistance circuit 17.

A power supply monitoring circuit 40 monitors a fluctuation in the power supply voltage Vin and outputs a detected signal to the output control circuit 15 when the power supply voltage Vin becomes lower than a prescribed voltage. When the output control circuit 15 receives the detected signal from the power supply monitoring circuit 40, the output control circuit 15 outputs a signal of an H level to stop the PMOS transistor 3.

[Patent Document 1] Japanese Patent Application Laid-Open No. 2005-328589

However, there is a need to improve the power efficiency while securing safety in the switching regulator.

SUMMARY OF THE INVENTION

In order to solve the related art problems, a switching regulator of the present invention is configured as follows.

The switching regulator is provided which is equipped with an error comparator which monitors an output voltage, an output control circuit which outputs a control signal to a gate of a switching element, based on an output signal of the error comparator, and a power supply monitoring circuit which, when a power supply voltage becomes less than or equal to a prescribed voltage, outputs a signal to the output control circuit to turn off the switching element, and in which the power supply monitoring circuit is inputted with a signal based on an output signal of the output control circuit and performs an intermittent operation in which the power supply monitoring circuit is operated only for a prescribed period.

Since a power supply monitoring circuit performs an intermittent operation when a power supply voltage Vin is greater than or equal to a prescribed voltage, current consumption of the power supply monitoring circuit is decreased, and particularly, the efficiency of a switching regulator at a light load is improved.

The switching regulator is applicable even to both of asynchronous and synchronous rectification. The switching regulator is applicable to any of fixed frequency control, fixed on-time control, and fixed off-time control.

After a power supply monitoring circuit detects a low voltage and stops a switching operation, the power supply monitoring circuit is capable of detecting that the power supply voltage Vin rises again and returning to a normal operating state.

DETAILED DESCRIPTION OF THE PREFERRED EMBODIMENTS

Preferred embodiments of the present invention will hereinafter be described with reference to the accompanying drawings.

Figure 1:
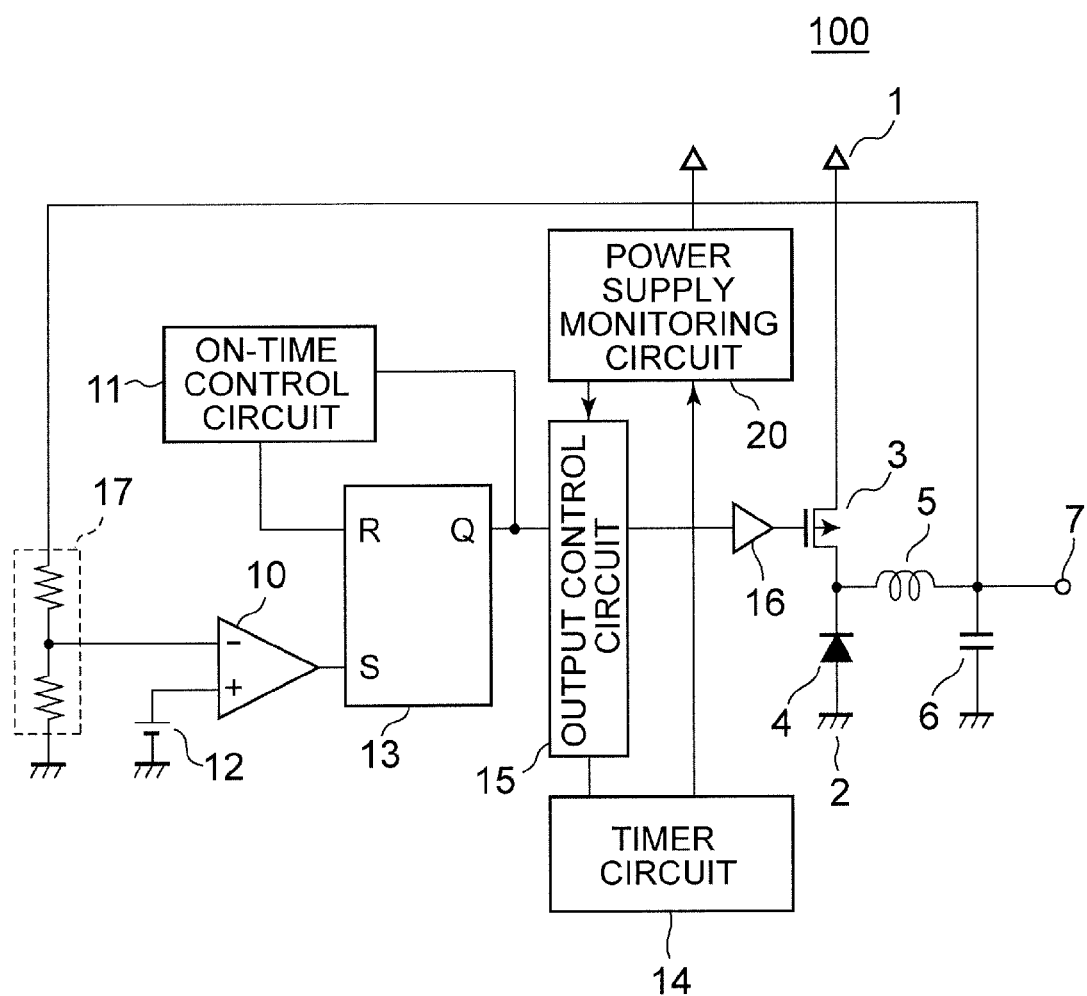
FIG. 1 is a diagram illustrating a circuit example of an asynchronous rectification switching regulator according to a first embodiment of the present invention.

FIG. 1 is a diagram illustrating a circuit example of a switching regulator according to a first embodiment of the present invention. FIG. 1 is an asynchronous rectification type switching regulator which converts a power supply voltage Vin inputted to an input terminal 1 into a constant voltage and outputs the same to an output terminal 7 as an output voltage Vout.

The switching regulator 100 is equipped with a switching element 3, a diode 4, an inductor 5, an output capacitor 6, an error comparator 10, an on-time control circuit 11, a reference voltage circuit 12, an RS-FF circuit 13, a timer circuit 14, an output control circuit 15, a buffer circuit 16, a voltage division resistance circuit 17, and a power supply monitoring circuit 20.

The switching element 3 and the diode 4 are provided in series between the input terminal 1 and a ground terminal 2. The inductor 5 is provided between the output terminal 7 and a connecting point of the switching element 3 and the diode 4. The output capacitor 6 is provided between the output terminal 7 and the ground terminal 2.

The reference voltage circuit 12 outputs a reference voltage VREF. The voltage division resistance circuit 17 outputs a feedback voltage VFB obtained by dividing the output voltage Vout. The error comparator 10 compares the reference voltage VREF and the feedback voltage VFB and outputs a signal to a set terminal S of the RS-FF circuit 13. The on-time control circuit 11 outputs a signal to a reset terminal R of the RS-FF circuit 13, based on an output signal of the RS-FF circuit 13. In response to the output signal of the RS-FF circuit 13, the output control circuit 15 controls the operation of the switching element 3 through the buffer circuit 16 to generate the output voltage Vout.

The power supply monitoring circuit 20 monitors the power supply voltage Vin. When the power supply voltage Vin is in a lowered voltage state of a prescribed voltage or less, the power supply monitoring circuit 20 outputs a signal to the output control circuit 15 to turn off the switching element 3, thereby preventing a malfunction. In response to a signal outputted from the output control circuit 15, the timer circuit 14 counts a timer and outputs a signal for reducing current consumption of the power supply monitoring circuit 20 after a prescribed time (called a count time) has elapsed.

Figure 2:
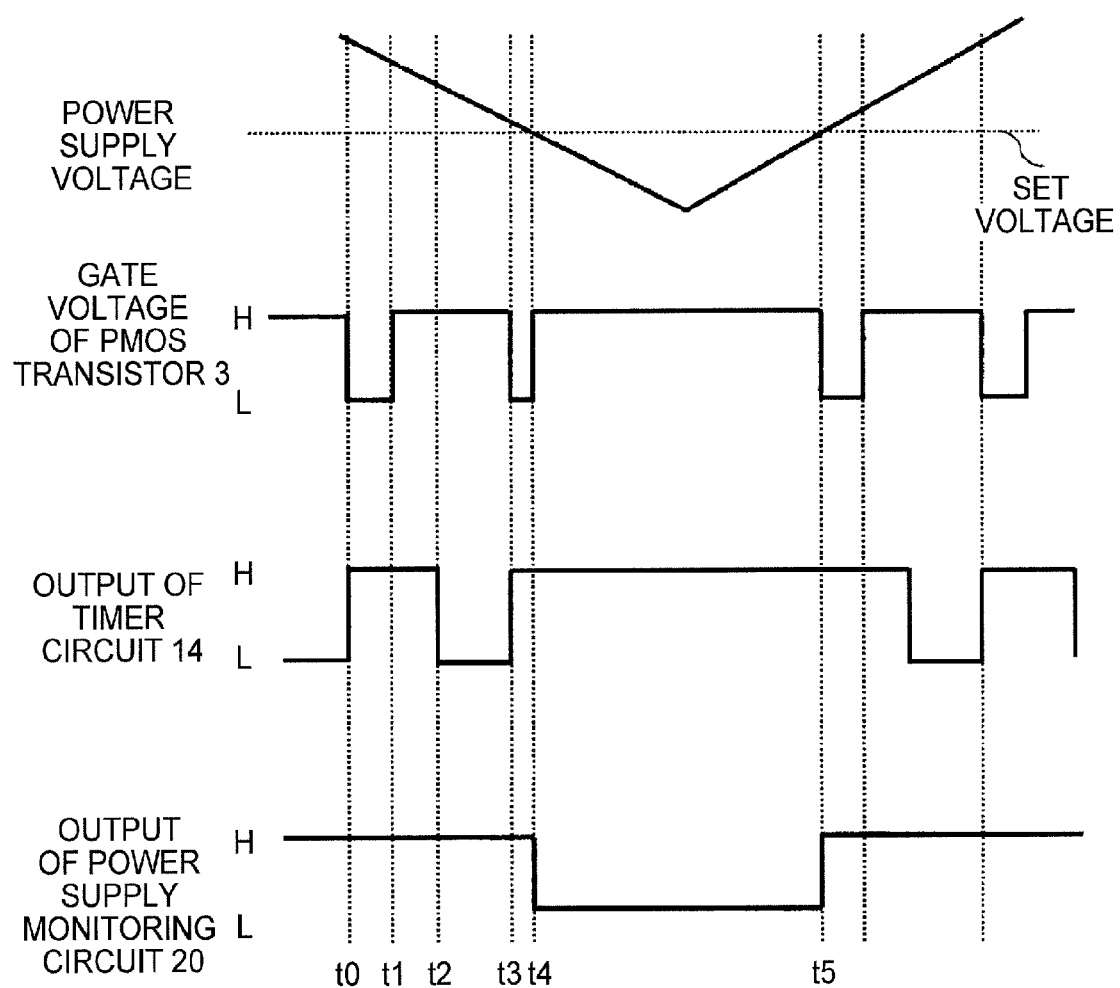
FIG. 2 is a diagram illustrating a timing chart of the operation of a power supply monitoring circuit in the first embodiment of the present invention.

FIG. 2 is a diagram illustrating a timing chart of the operation of the power supply monitoring circuit 20 in the first embodiment of the present invention.

When the power supply voltage Vin is greater than or equal to the prescribed voltage, the power supply monitoring circuit 20 monitors the started-up power supply voltage Vin in response to an H signal of the timer circuit 14 simultaneously when the switching element 3 is turned on at a time t0. Then, the power supply monitoring circuit 20 stops power supply monitoring at a time t2 when the count time of the timer circuit 14 has elapsed from the time t0. And then the power supply monitoring circuit 20 is operated simultaneously when the switching element 3 is turned on at a time t3. During this period, the power supply monitoring circuit 20 continues to output an H signal.

Thus, since the power supply monitoring circuit 20 repeats its operation and stop, based on the count time of the timer circuit 14, a reduction in power consumption can be realized.

When the power supply voltage Vin falls below the prescribed voltage at a time t4, the power supply monitoring circuit 20 outputs an L signal being a power supply voltage Vin drop signal and thereby stops the operation of the switching element 3 through the output control circuit 15. When, however, the power supply monitoring circuit 20 is stopped at a time t4, the power supply monitoring circuit 20 does not output the power supply voltage Vin drop signal. In such a case, when the switching element 3 is next turned on, the power supply monitoring circuit 20 starts up simultaneously and outputs the power supply voltage Vin drop signal.

During a period from the time t4 when the switching element 3 is stopped to a time t5 when the switching element 3 resumes its operation, the power supply monitoring circuit 20 always monitors the power supply voltage Vin and continues a detection operation.

Thereafter, when the power supply voltage Vin rises and exceeds the prescribed voltage at the time t5, the power supply monitoring circuit 20 outputs the H signal to resume the operation of the switching element 3.

Figure 3:
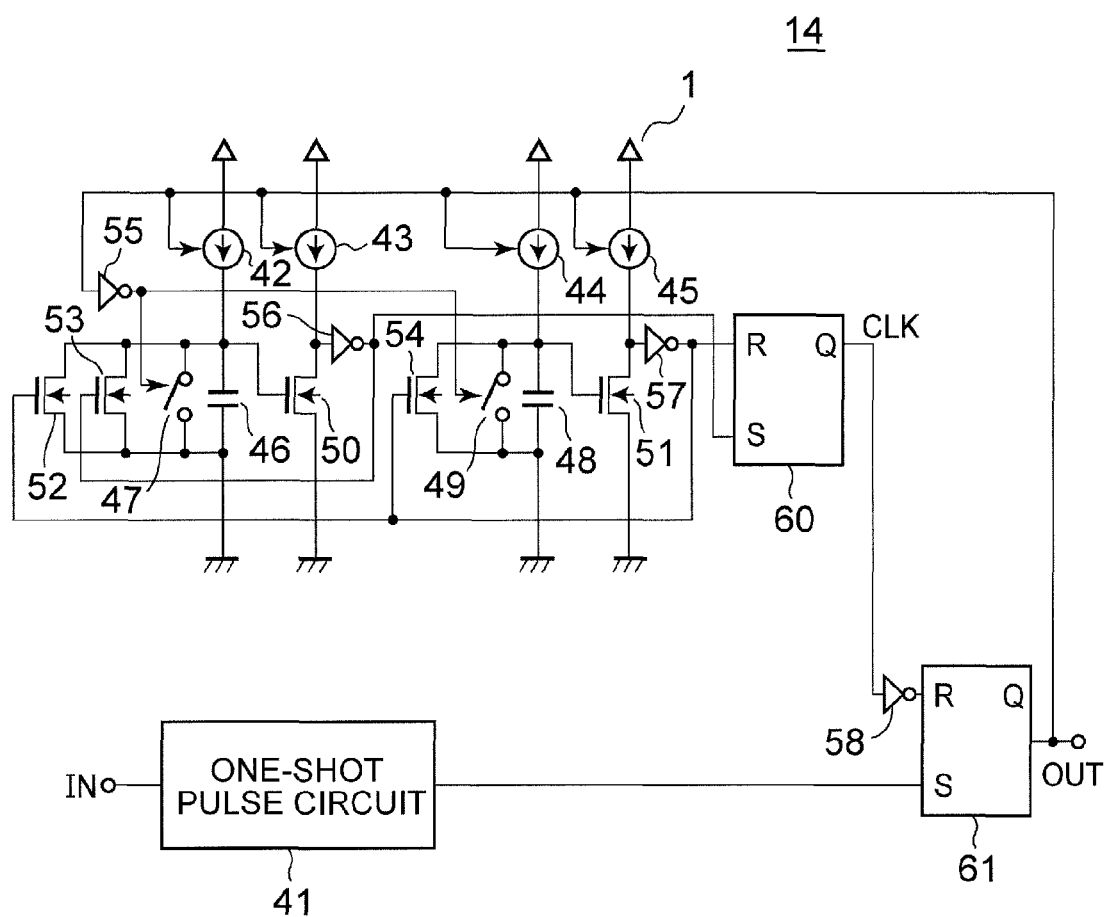
FIG. 3 is a diagram illustrating a circuit example of a timer circuit in the first embodiment of the present invention.

FIG. 3 is a diagram illustrating a circuit example of the timer circuit 14 in the first embodiment of the present invention. A one-shot pulse circuit 41 outputs an H signal when a signal turning off the switching element 3 is inputted to an IN terminal from the output control circuit 15. On the other hand, when a signal turning on the switching element 3 is inputted from the output control circuit 15, the one-shot pulse circuit 41 outputs an L signal pulse of a prescribed period.

Bias circuits 42, 43, 44, and 45 are turned on in response to the rise of the output of an RS-FF circuit 61 to output currents, based on the power supply voltage Vin applied to the input terminal 1.

A capacitor 46 is connected to the output of the bias circuit 42 and charged by the current of the bias circuit 42. A capacitor 48 is connected to the output of the bias circuit 44 and charged by the current of the bias circuit 44. The capacitor 48 is larger in capacity than the capacitor 46. Therefore, a charging time up to reaching the prescribed voltage, of the capacitor 48 is longer than that of the capacitor 46.

An NMOS transistor 50 is turned on when the charging voltage of the capacitor 46 becomes equal to or greater than its threshold voltage, and outputs an L signal therefrom. An NMOS transistor 51 is turned on when the charging voltage of the capacitor 48 becomes equal to or greater than its threshold voltage, and outputs an L signal therefrom.

An inverter 56 outputs a signal obtained by inverting an H/L signal of the output of the NMOS transistor 50 to a set terminal S of an RS-FF circuit 60 and a gate of an NMOS transistor 53. An inverter 57 outputs a signal obtained by inverting an H/L signal of the output of the NMOS transistor 51 to a reset terminal R of the RS-FF circuit 60 and gates of NMOS transistors 52 and 54.

The NMOS transistors 52 and 53 are connected in parallel with the capacitor 46. When the H signal is inputted to the gates of the NMOS transistors 52 and 53, the NMOS transistors 52 and 53 are turned on to discharge the electric charge of the capacitor 46. The NMOS transistor 54 is connected in parallel with the capacitor 48. When the H signal is inputted to the gate of the NMOS transistor 54, the NMOS transistor 54 is turned on to discharge the electric charge of the capacitor 48.

An inverter 55 outputs a signal obtained by inverting an H/L signal outputted from an output terminal Q of the RS-FF circuit 61 to switches 47 and 49.

The switch 47 is connected in parallel with the capacitor 46 and turned on in response to the L signal outputted from the RS-FF circuit 61 through the inverter 55 to discharge the electric charge of the capacitor 46. The switch 49 is connected in parallel with the capacitor 48 and turned on ion response to the L signal outputted from the RS-FF circuit 61 through the inverter 55 to discharge the electric charge of the capacitor 48.

The RS-FF circuit 60 outputs a signal from an output terminal Q thereof, based on the signals inputted to the set terminal S and the reset terminal R to generate a clock signal. The RS-FF circuit 61 has a set terminal S inputted with the output signal of the one-shot pulse circuit 41, a reset terminal R inputted with the clock signal outputted from the RS-FF circuit 60, and the output terminal Q from which the signal is outputted.

The timer circuit is not limited to this circuit example, but may be a circuit which starts operating when a trigger signal is inputted and finishes operating when a timer passes over a set time. When the trigger signal is inputted in the course of the operation of the timer circuit, such a timer circuit starts to recount from its initial value again.

Figure 4:
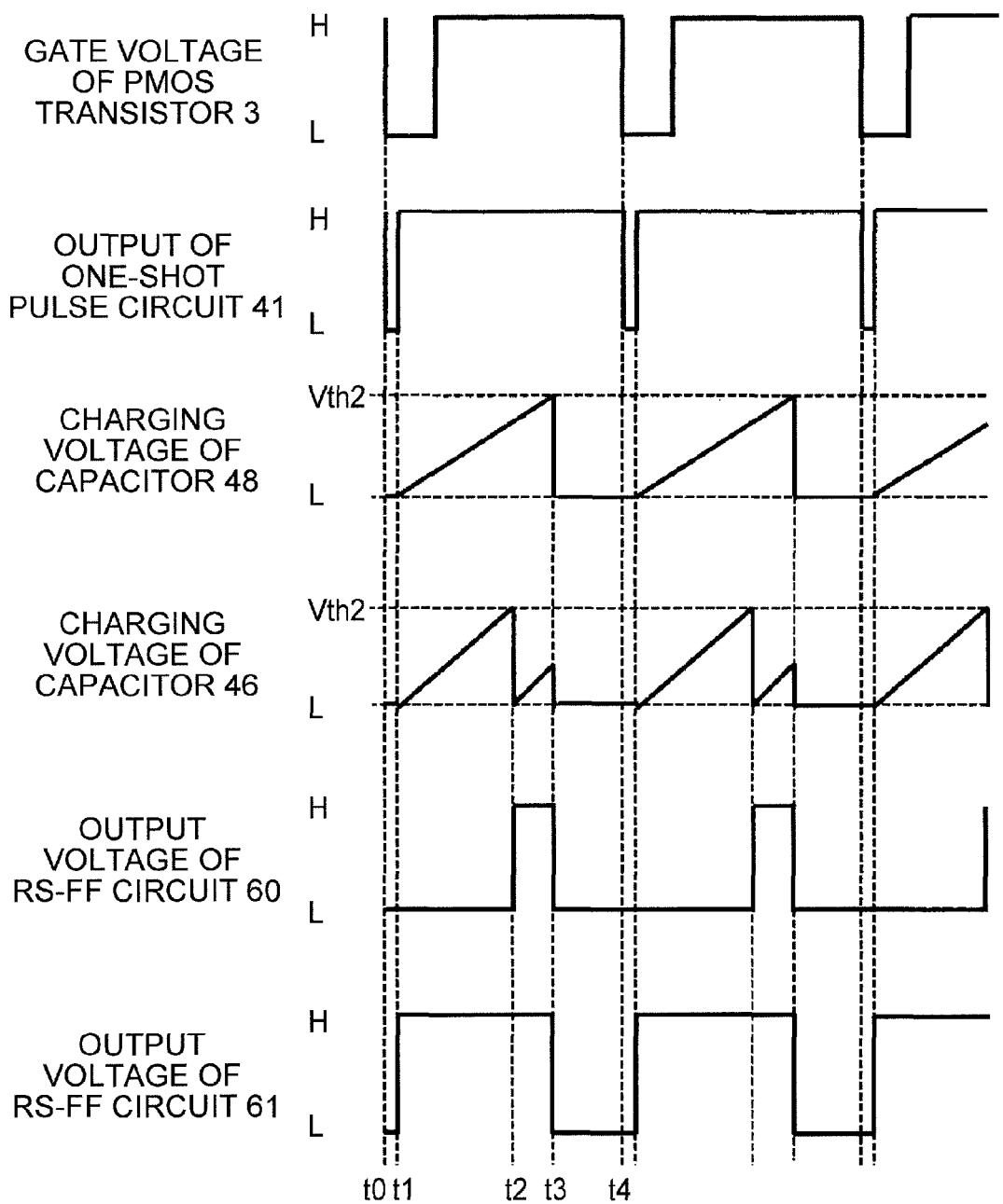
FIG. 4 is a timing chart illustrating an operation example of the timer circuit in the first embodiment of the present invention.

The operation of the timer circuit 14 will next be described based on a timing chart illustrating an operation example of the timer circuit 14 in the first embodiment of the present invention in FIG. 4.

When an output signal of the output control circuit 15 is inputted to the IN terminal of the timer circuit 14 at a time t0, the one-shot pulse circuit 41 outputs an L signal pulse. At this time, the capacitors 46 and 48 are discharged and hence their charging voltages are at L.

At a time t1, an H signal is outputted from the one-shot pulse circuit and inputted to the set terminal S of the RS-FF circuit 61. Thus, the H signal outputted from the RS-FF circuit 61 turns on the bias circuits 42, 43, 44, and 45 to start the supply of currents, thereby charging the capacitors 46 and 48. At the same time, the outputted H signal of the RS-FF circuit 61 is inverted by the inverter 55 and the switches 47 and 49 are turned off by the so-inverted L signal.

When the charging voltage of the capacitor 46 reaches a threshold voltage Vth1 of the NMOS transistor 50 by the current supplied from the bias circuit 42 at a time t2, the NMOS transistor 50 is turned on to output an L signal. The L signal is converted into an H signal by the inverter 56, which in turn is inputted to the set terminal S of the RS-FF circuit 60. Thus, the H signal is outputted from the output terminal Q of the RS-FF circuit 60. The outputted signal is inverted by an inverter 58 and inputted to the reset terminal R of the RS-FF circuit 61. Then, the H signal is successively outputted from an OUT terminal. At the same time, the H signal outputted from the inverter 56 turns on the NMOS transistor 53 to discharge the capacitor 46. The charging voltage of the capacitor 48 larger in capacitance value than the capacitor 46 does not reach a threshold voltage Vtn2 of the NMOS transistor 51, and hence charging to the capacitor 48 is continued.

When the charging voltage of the capacitor 48 reaches the threshold voltage Vtn2 of the NMOS transistor 51 at a time t3, the NMOS transistor 51 is turned on to output an L signal. The L signal is converted into an H signal by the inverter 57, which in turn is inputted to the reset terminal R of the RS-FF circuit 60. On the other hand, the H signal outputted from the inverter 57 turns on the NMOS transistors 52 and 54 to discharge the capacitors 46 and 48. At this time, since the NMOS transistor 50 is off, an H signal is outputted therefrom and hence an L signal is inputted to the set terminal S of the RS-FF circuit 60 through the inverter 56. The RS-FF circuit 60 inputted with the L signal at the set terminal S and the H signal at the reset terminal R outputs an L signal from the output terminal Q. The L signal is inputted to the reset terminal R through the inverter 58 as an H signal, so that the RS-FF circuit 61 outputs an L signal therefrom. At a time t4, an output signal of the output control circuit 15 is inputted to the IN terminal of the timer circuit 14, and the one-shot pulse circuit 41 outputs an L signal pulse. The RS-FF circuit 61 outputs an H signal at the rise of the L signal pulse.

As described above, when the switching element 3 is turned on, the timer circuit 14 outputs the H signal to start the time count and after a count time, outputs the intermittent signal of the cycle in which the L signal is outputted. This count time can be set by the capacitance value of the capacitor 48, the current value of the bias circuit 44, and the threshold voltage of the NMOS transistor 51.

Also in the present example, the count time is set shorter than the switching cycle of the switching element 3. When the count time is set longer than the switching cycle, the signal for turning on the switching element 3 is inputted before the count time is reached, and the time count is started again. Therefore, the timer circuit 14 continues to output the H signal.

Thus, the intermittent output or the constant output can be selected according to the situation by adjusting the relation between the count time and the switching cycle.

Figure 5:
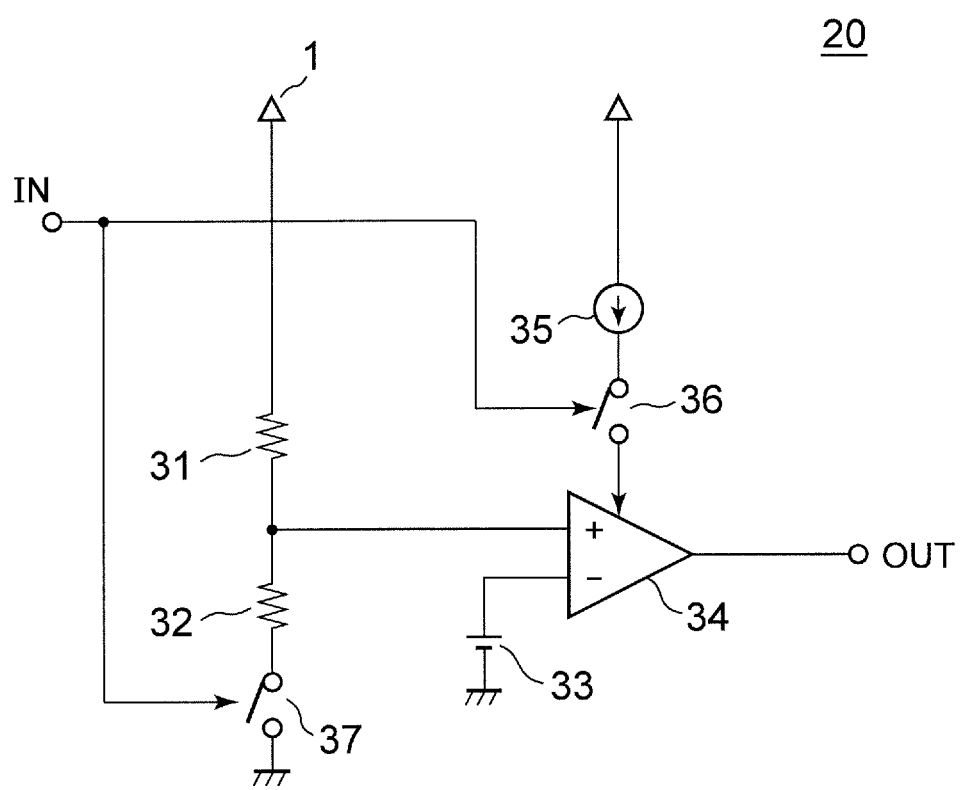
FIG. 5 is a diagram illustrating a circuit example of the power supply monitoring circuit in the first embodiment of the present invention.

FIG. 5 is a diagram illustrating a circuit example of the power supply monitoring circuit in the first embodiment of the present invention. The power supply monitoring circuit 20 is equipped with voltage division resistors 31 and 32, a reference voltage circuit 33, a comparator 34 which latches an output signal, and a bias circuit 35. Further, the power supply monitoring circuit 20 is equipped with a switch 36 which controls the supply of a current from the bias circuit 35 to the comparator 34, and a switch 37 which shuts off a current flowing through the voltage division resistors 31 and 32.

In a state in which the switches 36 and 37 are off, a divided voltage from a voltage division resistance circuit comprised of the voltage resistors 31 and 32 is pulled up to a power supply voltage Vin.

When the H signal is received from the timer circuit 14, the switches 36 and 37 are turned on so that the current is supplied to the voltage division resistors 31 and 32 and the comparator 34. The comparator 34 compares the divided voltage and a reference voltage outputted from the reference voltage circuit 33 to monitor the power supply voltage Vin. When the divided voltage is a low voltage being less than or equal to a reference voltage value, the comparator 34 outputs an L signal from an OUT terminal. Then, the comparator 34 continues power supply monitoring until the divided voltage is determined not to be the low voltage. When the divided voltage is determined to be the reference voltage value or more, the comparator 34 outputs an H signal from the OUT terminal. At this time, the switches 36 and 37 perform an on/off operation, based on a signal inputted to an IN terminal from the timer circuit 14. When the switch 36 is off, the comparator 34 latches a signal used when being on and thereby outputs an intermittent signal from the OUT terminal. A voltage in the power supply monitoring circuit 20, for determining whether or not the power supply voltage Vin is a low voltage is determined by the reference voltage value of the reference voltage circuit 33 and a voltage division ratio of the voltage division resistance circuit.

The switching regulator of the present invention which has adopted the above-described timer circuit 14 and power supply monitoring circuit 20 is capable of controlling the intermittent operation by changing the relation between the count time and the switching cycle.

For example, when the count time is set longer than the switching cycle, the intermittent operation and always-on operation of the power supply monitoring circuit 20 are switched by a load connected to the output terminal 7.

When the load is heavy, the power supply monitoring circuit 20 assumes a continuous mode operating state in which the switching element 3 performs an oscillation operation in a prescribed switching cycle. Therefore, even though the timer circuit 14 starts the time count in response to the signal of the output control circuit 15, the timer circuit 14 receives a signal from the output control circuit 15 again before a prescribed count time is reached. As a result, the timer circuit 14 continues to output an on signal, and the power supply monitoring circuit 20 does not assume the intermittent operation.

When the load is light, the power supply monitoring circuit 20 is transited to a discontinuous mode operating state in which a fluctuation in the output voltage Vout becomes small and the operation of the switching element 3 does not assume an oscillation operation in a prescribed cycle, so that the frequency is decreased. Further, when the switching cycle falls above the count time, the timer circuit 14 outputs an on/off signal, and the power supply monitoring circuit 20 performs an intermittent operation. Thus, it is possible to reduce power consumption of the power supply monitoring circuit 20.

Further, when the count time of the timer circuit 14 is set shorter than the switching cycle, the power supply monitoring circuit 20 assumes the intermittent operation irrespective of the load connected to the output terminal 7. It is therefore possible to reduce power consumption.

In the above description, although the time count of the timer circuit 14 is started simultaneously when the switching element 3 is turned on, the time count thereof may be started simultaneously when the switching element 3 is turned off.

Figure 6:
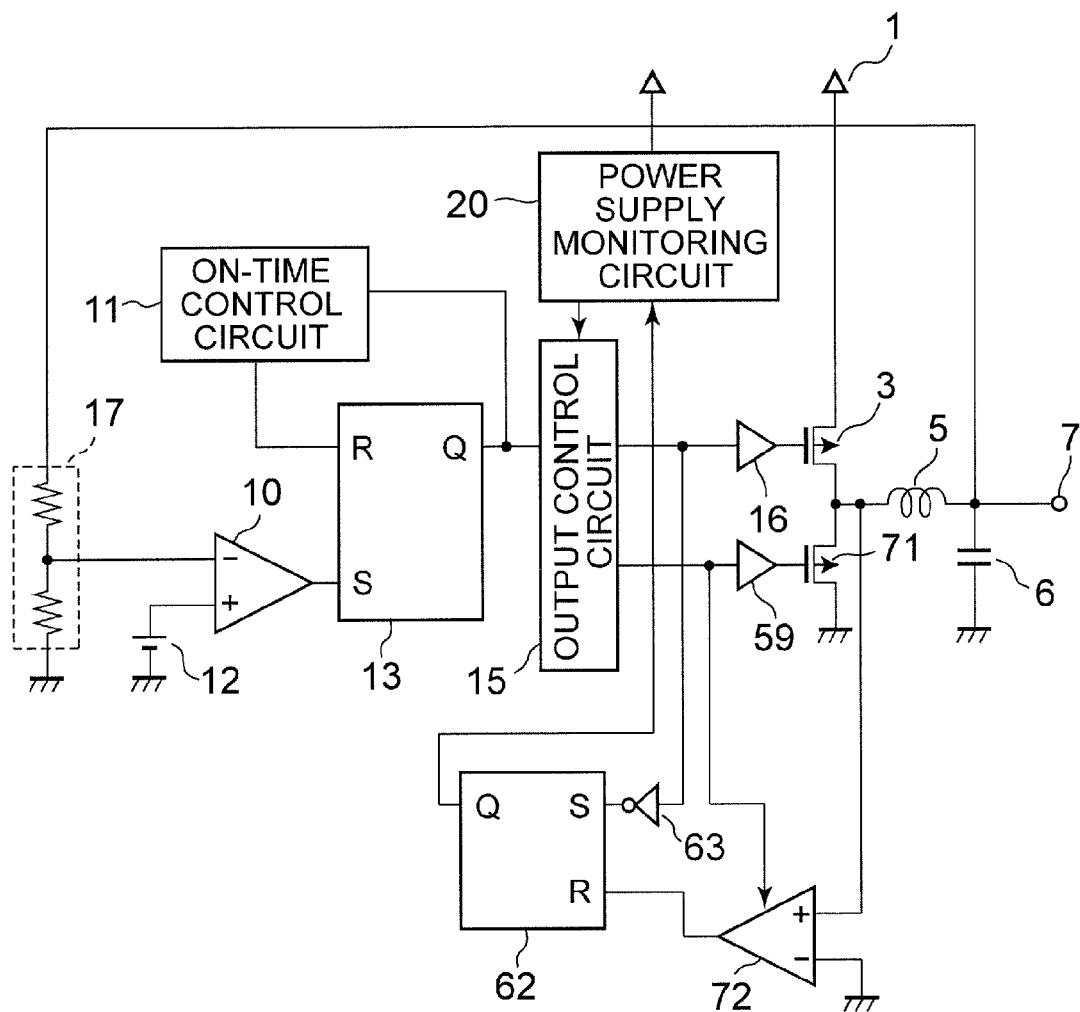
FIG. 6 is a diagram illustrating a circuit example of a synchronous rectification switching regulator according to a second embodiment of the present invention.
Figure 7:
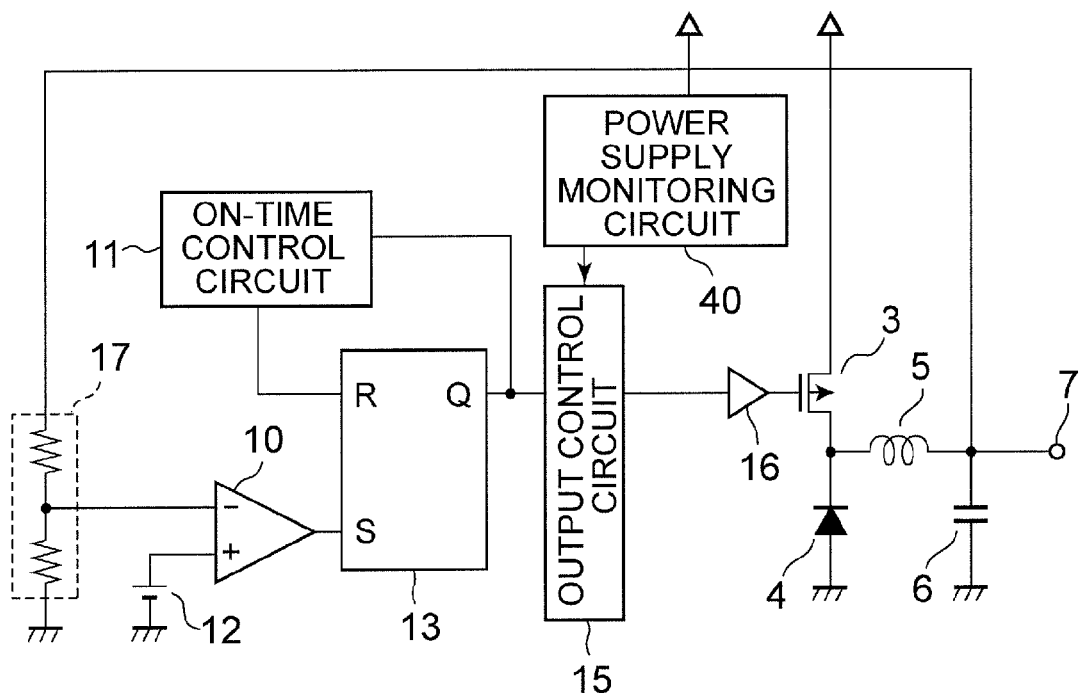
FIG. 7 is a diagram illustrating a circuit example of a related art asynchronous rectification switching regulator.

FIG. 6 is a diagram illustrating a circuit example of a synchronous rectification switching regulator according to a second embodiment of the present invention. The switching regulator according to the present embodiment is equipped with a second switching element 71 which performs a switching operation contrary to a first switching element 3. Also, the switching regulator according to the present embodiment is equipped with a buffer circuit 59 which drives the second switching element 71. An output control circuit 15 controls the buffer circuit 59.

Further, the switching regulator according to the present embodiment is equipped with a backflow detection circuit 72 which performs the detection of an inverse current flowing in the direction of the second switching element 71 from an output terminal 7. When the backflow detection circuit 72 detects the inverse current, the backflow detection circuit 72 outputs a signal forcibly turning off the second switching element 71 to the output control circuit 15. Then, the backflow detection circuit 72 performs a detection operation only during a period in which the second switching element 71 is on, and stops its detection synchronously when the second switching element 71 is off. In order to realize this operation, the present embodiment is configured in such a manner that a signal inputted to the buffer circuit 59 is inputted simultaneously to the backflow detection circuit 72. The backflow detection circuit 72 switches the operation and stop, based on the signal inputted thereto.

An RS-FF circuit 62 receives at its set terminal S, a signal obtained by inverting an input signal of a buffer circuit 16 by an inverter 63. Also the RS-FF circuit 62 receives an output signal of the backflow detection circuit 72 at its reset terminal R. Therefore, the RS-FF circuit 62 outputs an H signal when the first switching element 3 is turned on, and outputs an L signal when the inverse current is generated. Then, a power supply monitoring circuit 20 is operated during a time from a time when the first switching element 3 is turned on and to a time when the second switching element 71 is turned off.

When a load is heavy and a continuous mode operating state is present, a power supply monitoring circuit 20 is not brought to an intermittent operation and continues an always-on operation. When the load becomes light and an inverse current flowing through the second switching element 71 is generated, the backflow detection circuit 72 forcibly turns off the second switching element 71 and stops a power supply monitoring operation.

Thus, when the load becomes light and a switching cycle becomes long, the power supply monitoring circuit 20 is intermittently operated and thereby capable of reducing power consumption.

Incidentally, although the above description has been made about the case in which the power supply monitoring circuit monitors the power supply voltage Vin and stops the operation of the switching regulator to thereby protect the switching regulator, the power supply monitoring circuit can also be applied to a monitoring circuit which monitors an internal power supply driving an in-circuit control circuit of a switching regulator.

Also, the power supply monitoring circuit can also be applied to an OVP (Over Voltage Protection) circuit which monitors an output voltage Vout and detects an overvoltage state to stop the operation of a switching regulator.

Further, the power supply monitoring circuit can also be applied to a UVP (Under Voltage Protection) circuit which detects a reduction in an output voltage Vout to stop the operation of a switching regulator.

Furthermore, it is needless to say that the power supply monitoring circuit 20 appropriately change the inverters connected to the inputs of the set terminal S and reset terminal R of the RS-FF circuit 62 to thereby make it possible to set operations at various timings.

What is claimed is:

1. A switching regulator outputting a desired output voltage to an output terminal by a switching element from a power supply voltage inputted to an input terminal, comprising:
   an error comparator which monitors the output voltage;
   an output control circuit which outputs a control signal to a gate of the switching element, based on an output signal of the error comparator; and
   a power supply monitoring circuit which, when the power supply voltage becomes less than or equal to a prescribed voltage, outputs a signal to the output control circuit to turn off the switching element,
   wherein the power supply monitoring circuit is inputted with a signal based on an output signal of the output control circuit and performs an intermittent operation in which the power supply monitoring circuit is operated only for a prescribed period.

2. The switching regulator according to claim 1, wherein the prescribed period is a period in which at least the switching element is on.

3. The switching regulator according to claim 1, comprising a timer circuit which outputs a signal for causing the power supply monitoring circuit to be intermittently operated, based on the output signal of the output control circuit.

4. The switching regulator according to claim 2, comprising a timer circuit which outputs a signal for causing the power supply monitoring circuit to be intermittently operated, based on the output signal of the output control circuit.

* * * * *